United States Patent [19]

Coscia

[11] 4,356,617
[45] Nov. 2, 1982

[54] DECORATIVE EMBLEMS AND METHOD FOR MAKING SAME

[75] Inventor: Charles M. Coscia, Columbus, Ohio

[73] Assignee: The D. L. Auld Company, Columbus, Ohio

[21] Appl. No.: 244,505

[22] Filed: Mar. 16, 1981

[51] Int. Cl.³ .............................................. B05D 1/26
[52] U.S. Cl. .................................. 29/527.4; 427/147; 427/162; 427/270; 427/272; 427/275; 427/282; 427/287; 427/421; 118/315; 428/13; 428/40; 428/195; 264/132; 264/135; 264/284; 264/293
[58] Field of Search ............... 427/147, 270, 272, 275, 427/282, 287, 421, 162; 264/132, 135, 284, 293; 425/98, 90, 130; 72/46; 118/315; 29/527.4; 428/40, 13, 195

[56] References Cited

U.S. PATENT DOCUMENTS

| | | |
|---|---|---|
| 2,244,565 | 6/1941 | Nast . |
| 2,931,119 | 4/1960 | Gits et al. . |
| 3,059,610 | 10/1962 | Mintz .................................. 118/315 |
| 3,075,249 | 1/1963 | Sucher . |
| 3,114,597 | 12/1963 | Lee . |
| 3,246,066 | 4/1966 | Gits . |
| 3,431,889 | 3/1969 | Fraatz . |
| 3,654,062 | 4/1972 | Loew . |
| 4,087,570 | 5/1978 | Beinbrech . |
| 4,100,010 | 7/1978 | Waugh . |
| 4,139,654 | 2/1979 | Reed . |
| 4,148,855 | 4/1979 | Stalter et al. ......................... 264/293 |
| 4,292,827 | 10/1981 | Waugh ..................................... 72/46 |

Primary Examiner—Shrive P. Beck
Attorney, Agent, or Firm—Biebel, French & Nauman

[57] ABSTRACT

A method of casting decorative emblems is disclosed wherein a fluent, viscous, plastic material is dispensed by a means having a plurality of dispenser orifices onto a foil substrate typically lithographed or screen printed with an array of designs. The cast plastic melds together and forms a meniscus which, when hardened, gives a lens effect to the foil shape. The process is well adapted for automated, mass production of foil backed emblems.

12 Claims, 3 Drawing Figures

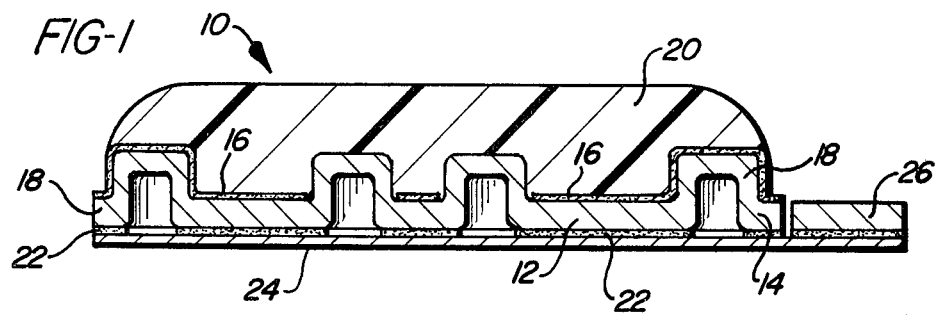
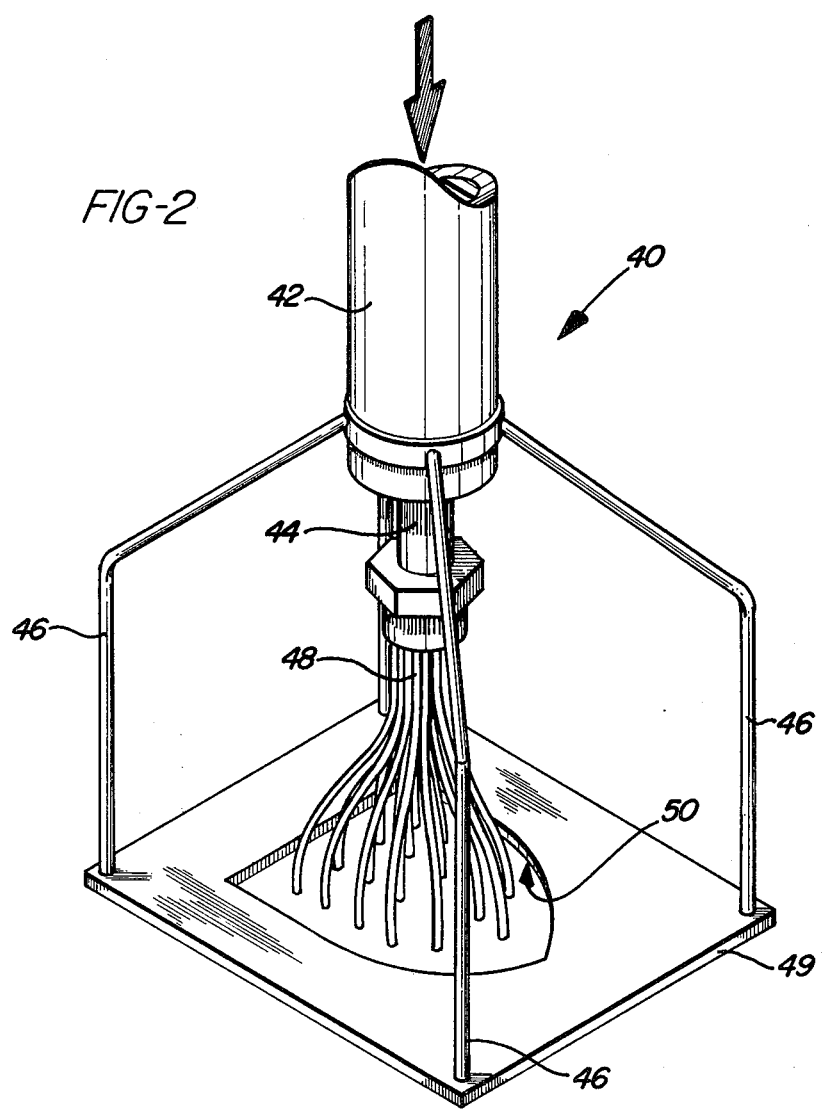

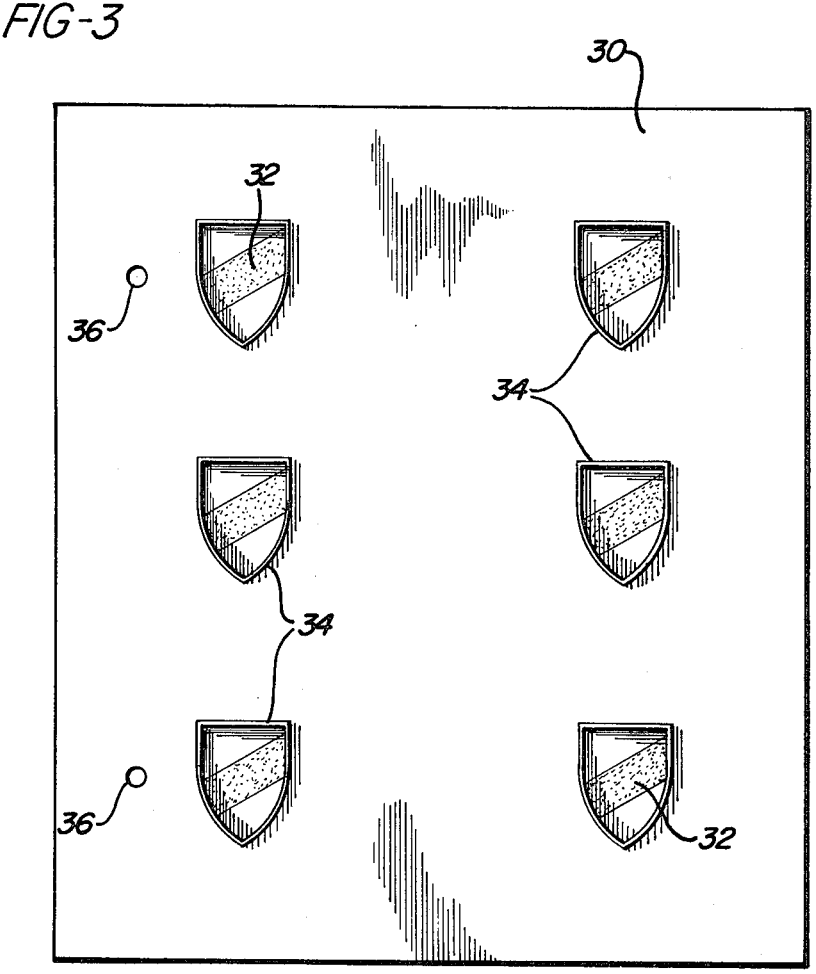

DECORATIVE EMBLEMS AND METHOD FOR MAKING SAME

BACKGROUND OF THE INVENTION

The present invention relates to decorative emblems which have a cured plastic layer over a decorative surface and a method for making such emblems. More particularly, it relates to decorative emblems produced by the method of coating a fluent plastic material onto a flat decorative foil shape to produce a thin positive meniscus which, when the plastic is cured, gives a lens effect to the decorative surface beneath.

Decorative plaques and emblems are widely used throughout a number of industries including the automotive and appliance industries. In the past, such plaques and emblems were formed by flowing a colored vitreous frit into a bronz substrate and firing it at 1250° F. The glass-like vitreous enamel served to beautify the product and protect the decorative emblem from weathering. Today, plastics are primarily used for making such plaques and emblems. For example, the assignee of the present invention has been producing emblems since 1966 which have a molded or cast body into which plastic is deposited. A description of such products can be found in the July-August, 1972 issue of *duPont Magazine*, pp. 29–31.

Likewise, Loew, U.S. Pat. No. 3,654,062, discloses a process for injection molding a decorative Mylar facing sheet over a vinyl plastic body. The plaque is coated with a layer of protective varnish on the outer surface of the facing sheet. Gits, U.S. Pat. No. 3,246,066, is similar in that male and female molds are used to form a cavity into which a decorative foil is placed and into which a clear plastic material is injected. Prior to injecting a clear plastic material against the front face of the foil, the foil is precoated. Other molding processes such as compression molding are also known in the art. See for example, U.S. Pat. Nos. 2,244,565; 2,931,119; 3,075,249; and 3,114,597.

In Waugh, U.S. Pat. No. 4,100,010, assigned to the assignee of the present invention, there is disclosed an improved process of producing decorative emblems. That process involves casting a plastic material from a single nozzle onto decorative foil shapes to form a meniscus which when cured gives a lens effect to the top surface of the foil shape. A problem with that process is that the height of the lens cap so produced is considerable compared to the thickness of the foil substrate, requiring fairly large amounts of expensive plastic material. Another problem is that the foil shapes are cast individually by skilled workers, and the manufacturing process can as a result be too cumbersome and costly for some purposes and does not always yield the most efficient process for mass production. The same problems exist with respect to the methods of Beinbreck, U.S. Pat. No. 4,087,570 and Reed, U.S. Pat. No. 4,139,654, also assigned to the assignee of the present invention.

U.S. Pat. No. 4,292,827 discloses a process in which emblems are coated in sheets with a plastic material from a plurality of application tubes. However, this process has the disadvantage that the entire surface of the sheet is coated with plastic. This not only leads to a waste of material but requires tht the emblems be cut from the sheet with means capable of not only cutting the foil substrate but also of cutting through the hardened plastic. In accordance with the process taught in the application, cutting is performed in such a manner that a concavity is imparted to the surface. Control of this concavity formation adds additional complicating features.

Accordingly, the need exists for a method for coating clear plastic materials onto a decorative substrate less expensively, more efficiently, to produce an emblem having a relative thin lens cap.

SUMMARY OF THE INVENTION

The present invention utilizes a unique coating process to produce decorative emblems in a manner more conducive to mass production than the prior art processes. It also produces an emblem having a thinner lens cap thereon.

In accordance with the invention the lens cap is formed by coating a viscous, fluent, plastic material onto a foil shape bearing an emblem design using a nozzle having a plurality of closely spaced orifices such as closely spaced application tubes. The overall contour of the nozzle is generally that of a single emblem shape except that it is sized somewhat smaller than the emblem design area. Thus the exterior applicators of the set would be spaced slightly inside the exterior periphery of the emblem shape when placed directly over it.

It has been found that by using a nozzle having a plurality of applicator orifices it is possible to form a thinner lens cap and benefit from a significant savings in material and costs with little sacrifice in the beauty of the product. It has also been found that the thinner emblems formed in the present invention will post-form more easily and allow more complex geometric shapes.

Accordingly, it is an object of this invention to provide a decorative emblem insert having a thin lens cap over an indicia bearing surface.

It is another object of this invention tp provide a method of coating of fluent plastic onto a flat decorative foil shape to produce such a decorative emblem insert.

It is still another object to provide a process for mass producing decorative emblems bearing lens caps which yields cost and material savings and is effective for mass production.

These and other objects and advantages of the invention will become apparent from the following description, the accompanying drawings, and the appended claims.

BRIEF DESCRIPTION OF THE DRAWINGS

FIG. 1 is a cross-section of an emblem bearing a lens cap formed in accordance with the present invention; and FIG. 2 is a perspective view showing a casting apparatus used in practicing the present invention;

FIG. 3 is a planar view of a foil substrate having a series of emblem designs formed on the surface thereof by printing and embossing prior to applying the lens cap in accordance with the invention.

DETAILED DESCRIPTION OF THE INVENTION

A typical emblem as formed in the present invention is illustrated in FIG. 1 where the emblem 10 is formed on a metal foil 12 having an embossed design 14 formed therein. The design is screen printed as shown at 16 and includes a sharp peripheral edge formed in this case by the raised periphery 18 of the embossed design. The foil bearing the emblem design as described above has cast on the surface thereof a plastic cap 20 which provides a lens effect. The surface of the foil opposite the design carries a layer of adhesive 22 and a release liner 24 which is removed prior to application of the emblem to a surface. In the embodiment illustrated in FIG. 1 the emblem is formed with a pull tab 26 which facilities removal of the liner 24. The pull tab is also removed prior to application.

In accordance with the present invention emblems can be formed as taught in U.S. Pat. Nos. 4,087,570, 4,100,010, and 4,139,654 but with thinner lens caps using a nozzle having a plurality of orifices to apply the polymeric lens cap forming composition.

The actual number of orifices used in a particular nozzle varies depending on the size of the emblem shape, the spacing between applicator tubes, the applicator tube size, etc. Typically these orifices are provided by a multiplicity of applicator tubes. It is necessary to have a sufficient number of small enough applicator tubes so that the plurality of plastic deposits from the applicator tubes will meld together. For example, a nozzle having 16 applicator tubes 0.022 inch I.D. spaced equidistance from one another and positioned to form a suqare $\frac{3}{4}$ inch on a side is satisfactory for coating a square foil object 1 inch on a side. Nozzles containing tubes spaced approximately $\frac{1}{8}$ inch to $\frac{1}{4}$ inch have been found suitable for lens capping most emblem sizes.

After coating, the fluent plastic will flow somewhat while it is curing. As in the case of earlier foil-backed inserts manufactured by the assignee of the present invention, the sharply defined peripheral sides of each emblem shape help control the plastic flow (see for example, Waugh, U.S. Pat. No. 4,100,010). The flow characteristics of the lens cap composition, foil properties are coating conditions are such that a meniscus forms. In the present invention that meniscus formation takes place by reason of the flow from each of the multiple plastic deposits. The result is that plastic deposits flow together forming an over-all positive meniscus or crown for the emblem, but it is much lower than one formed by depositing the plastic from a single applicator tube as was the previous practice. In fact, in accordance with the invention the amount of plastic material can be reduced 50% in some emblems.

This is a significant improvement since the plastic capping material is relatively expensive. A thin lens cap reduces cost, and yet, it has been found that there is little loss in the depth of the lens effect achieved.

In accordance with the present invention individual foil shapes pre-cut from a foil substrate (as in U.S. Pat. No. 4,100,010) or emblem designs contained in contour in the foil substrate (as in U.S. Ser. No. 054,548) may be coated. As a result of the reduced lens cap thickness meniscus formation is possible in the present invention as long as a sharp peripheral edge is formed in the foil substrate by, among other means, embossing, printing, or etching the surface. A sharp peripheral edge formed by these or other means in combination with the fluid flow characteristics of the plastic (i.e., viscosity, curing rate, partial wetting ability, etc.) halts the flow of the lens cap coating composition causing a meniscus to form.

The decorative emblem design is preferably produced by printing an indicia on the upper surface of the foil substrate. The indicia may be applied by silk screen or lithographic printing.

It is often desirable to prime the upper surface of the substrate prior to printing. For this purpose, any suitable primer may be used, such as a silane primer. As an example, a mixture of about 2% castor oil (e.g. Surfactol from the Baker Castor Oil Co.) and up to about 2% silane (e.g., Dow 6020, 6040, or 6075 from Dow Corning Corp.) may be used. The primers may be preapplied by spraying, dipping or roll coating the foil substrate followed by heating to remove the solvent.

It is often desirable to enhance the design of the decorative surface by embossing. The embossing step may be used to both raise decorative areas in the emblem design and form sharply defined peripheral edges around each emblem design. An aluminum foil printed and embossed in selected areas to produce a sheet having a number of regularly spaced and arranged designs provides a facile means for mass production because it allows the emblems to be processed in sheet form.

The foil substrate may be a thin metal, a metalyzed Mylar polyester, Mylar polyesters or other plastic foils or other foil-like materials. A typical foil substrate of the present invention is illustrated in FIG. 3 where a series of emblem designs 32 are embossed and printed on a unitary thin metal (aluminum) sheet 30.

In order to create a sharply defined peripheral side for the purpose of controlling the flow of fluent plastic and meniscus formation, a raised dyke 34 may be formed in the area around each emblem design. This dyke may be formed as part of the embossing step. Registration holes 36 are provided in the foil sheet 30 to hold the sheet in the same place during printing, embossing, and casting of the lens cap.

An alternative method for forming the sharply defined peripheral sides is to print a raised dyke around each emblem design. Still another method for forming the sharply defined peripheral sides is to partially block or groove each emblem design. In that instance a raised dyke will not be formed, but one is not required if the surface tension which builds up at the groove halts the flow of fluent plastic. A groove or gap around the emblem design will also control the flow of plastic in the manner disclosed in U.S. Pat. No. 4,100,010.

On the foil substrate surface opposite that onto which the emblem designs are printed, i.e., the bottom surface, there is coated a pressure sensitive adhesive. The adhesive may be anyone of numerous know materials as long as it has sufficient bonding power to adhere the emblem ultimately produced to its intended surface, such as a preformed bezel. During the remaining steps of the present invention, however, it is preferred that a temporary release liner cover the adhesive coated bottom of the foil substrate. The release liner may be a typical silicone or fluorocarbon treated paper.

The decorated, adhesive-coated foil substrate is now ready for casting the fluent plastic onto its upper surface. It is important that the substrate be held flat and horizontal during flow coating because of the fact that the flow characteristics of the fluent plastic and the liquid wettability of the substrate are used to control the spread of the plastic so that it is contiguous with predetermined areas of the foil as well as forming a positive meniscus of the type described.

The flat decorative foil shapes may be cast individually, but the preferred arrangement is to provide a series of decorative emblem designs on a foil substrate which are cast automatically. The sharply defined peripheral edges are formed around each emblem design and the casting operation is automated so that a premeasured amount of fluent plastic is deposited by the nozzle means on each emblem design.

The casting apparatus illustrated in FIG. 2 may be used to automatically deposit a quantum of plastic on each emblem design. In FIG. 2 the casting apparatus is generally indicated by the numeral 40 comprises a carriage 42 upon which the nozzle 44 is supported by a plurality of stands 46. Stands 46 carry the casting registration plate 49 which is used to accurately locate the nozzle 48 over the shape to be cut. The cut out 50 of the plate 49 closely contours the dike 18 of the shape to be cast to assist in positioning the nozzle for coating. Other means including optical sensors and mechanical stops can also be used to position the nozzle. The nozzle is constituted of a plurality of applicator tubes 48 from which viscous plastic is cast on the emblem area such that the fluent plastic material is cast within the area defined by the sharp peripheral edge of the emblem.

Fluent plastic material is fed to the nozzle from a supply means (not shown), one example of which is illustrated in U.S. Pat. No. 4,100,010. When the carriage is in position over the emblem area to be capped, a premeasured quantum of plastic is cast on the surface of the foil from the plurality of orifices such as applicator tubes. The nozzle can be adjusted such that an equal amount of plastic is delivered by each applicator tube, or in some emblem designs, it might be advantageous to adjust the nozzle such that the tubes at the periphery or a portion of the tubes at the periphery deliver less plastic than those more centrally located in the emblem area. Upon casting, the quanta of plastic delivered by the plurality of applicator tubes flow together and meld and form a positive meniscus.

The coating apparatus discussed above is only one example of the machines that can be adopted to practice the present invention. Those skilled in the art will recognize others that may be used.

The substrate is preferably held stationary as well as flat and horizontal during casting by a vacuum table which may be of the type disclosed in U.S. Pat. No. 4,034,708. A vacuum table of the type disclosed in U.S. Pat. No. 4,034,708 is preferred because it facilitates curing of the cast plastic while heating or cooling the platen beneath the substrate. By heating the substrate it is also possible to affect the flow characteristics of the lens capping composition and thus be able to economize on composition without sacrificing the lens effect.

After curing the cast substrate is cooled and removed from the vacuum table. When an array of individual emblem shapes are contained in a single substrate, they are removed from it to form the individual emblems. This may be done by a die-cutting operation to stamp the emblems out of the substrate. During the die cutting operation it is possible to form a release lining pull tab as well. This permits easy removal of the release liner when the individual emblems are put into use by exposing the pressure-sensitive adhesive coated side to adhere them onto the intended base.

When a free body of liquid, such as the compound of this invention, is at rest on a solid, the degree of flatness on the top surface of the liquid is a function of the condition at the edges where the liquid contacts the solid. If the wettability characteristics of the liquid are such that liquid does not completely "wet" the solid, it indicates that the liquid particles attract each other more than the solid particles attract the liquid particles. That is, the cohesive forces of the liquid are grater than the adhesive forces of the solid and liquid. This condition of the liquid is called the "meniscus". The meniscus formed by the plastics used in the present invention when applied to a flat surface results in a lens effect. The lens effect is exploited by applying the plastic to a painted or decorated surface to increase the aesthetic values related to depth, clarity and brilliance. These characteristics are used to produce the foil-backed inserts. The meniscus formed by the plastics when contacting the retaining walls of the die cast cavities result in a lens effect.

The data below compares an emblem formed in accordance with the present invention using a plurality of dispenser tubes and an emblem formed in accordance with U.S. Pat. No. 4,100,010. In the data, typical invention crown heights are compared with the crown heights illustrated at Column 5 of the patent for the following items:

| Shape Plan View Geometry | Crown Height | | |
|---|---|---|---|
| | Equivalent Diameter (Inches) | U.S. 4,100,010 (Inches) | Invention (Inches) |
| Irregular | 1.125 | .080 | .040 |
| Circular | 1.100 | .080 | .040 |

For emblems of the size typically encountered the lens cap will be less than about 0.050 inch thick.

Various plastic materials may be applied to a foil shape in accordance with the present invention to form a lens cap. Principal among these materials are heat curable materials such as polyurethanes and particularly those described in U.S. Pat. No. 4,100,010. Basically that one is a mixture of a polyetherpolyol component ("A") which may be a difunctional, trifunctional and/or tetrafunctional polypropylene glycol containing a suitable catalyst and a diisocyanate component ("B"). Catalysts which promote a slow cure at room temperture so as to allow full flow of the liquid polyurethane before setting are preferred. Lead compounds are an example. Likewise, the UV curable materials of U.S. Pat. Nos. 4,087,570 and 4,139,654 may also be used.

While generally the plastic materials used herein will be thermosetting and can be cured by, for example, heating or infrared radiation, other radiation curable materials may also be used, for example, as mentioned, those cured by exposure to ultraviolet radiation. For some purposes a thermoplastic material which hardens upon cooling may also be suitable. These polymeric coatings are preferably clear.

EXAMPLE

The part manufactured was an emblem, approximately 0.8 in$^2$ in area. The production emblem normally obtained using a nozzle with one orifice has a lens thickness ranging from 0.070 inch to 0.080 inch. The lens produced in this example ranged in thickness from 0.034 inch to 0.036 inch.

5657H24 aluminum foil (one side bright) was sheared to 8 inch lengths, 18 inches wide by 0.015 inch thick. Two registration holes were pierced in each sheet for printing and embossing. The sheets were cleaned to remove surface contaminants, primed and air dried for 30 minues. Emblem designs were then screen printed with red DecoChem AMS-57, an epoxy based ink from Deco Coating Corp., Pittsburgh, Pennsylvania, and baked at 400° F. and then screen printed with blue DecoChem AMS-76 from Deco Coating Corp. and baked at 400° F. The foil sheets were then embossed (45 pieces per sheet) to form dykes around each emblem and the back side of the sheets were coated with a pressure sensitive adhesive, 3M968 from 3M Company, Minneapolis, Minn.

Lenses were then capped with a two-component polyurethane of the type disclosed in U.S. Pat. No. 4,100,010 using a 22-prong nozzle which contoured the emblem geometry. During casting, the sheet was held against a vacuum platen. The temperature of the platent was held at 125° F. The nozzles had an inside diameter of 0.022 inch and were separated by approximately a 0.50 inch spacing. Nozzle countour was at least 0.050 inch inside the embossed dyke surrounding part. The emblems were cast with a manually-held nozzle or could be cast automatically via a programmed movable nozzle. The latter is the preferred method of manufacture. The urethane shot time for each emblem was 0.2 second which equates to an individual nozzle flow rate of 6.5 grams/min.

While the sheet was held against the vacuum platen the lens cap was cured by continuous exposure to IR radiation for 6 minutes. The emblems were then blanked from the sheet.

While the invention has been described in detail and by reference to specific embodiments thereof, it will be apparent to those skilled in the art that numerous variations and modifications are possible without departing from the spirit of the invention as defined in the following claims.

What is claimed is:

1. A method for producing decorative emblem inserts having a thin lens cap over an indicia-bearing foil shape, comprising:
   (a) providing a series of foil shapes, each shape having an indicia-bearing upper surface, a bottom surface, and sharply defined peripheral edges around the area over which said lens cap is to be formed and said bottom surface carrying an adhesive,
   (b) holding said foil shapes flat and horizontal on a supported surface,
   (c) depositing individual measured amounts of clear viscous fluent plastic onto each of said foil shapes on said indicia-bearing top surface from a plurality of closely spaced orifices overlying essentially the entire surface of said foil shape so that the plastic deposits from said orifices meld together and flow to said sharply defined peripheral edges of said foil shape and form a positive meniscus, and
   (d) curing said plastic while maintaining said substrate flat and horizontal, whereby said cured plastic forms a thin lens cap over each foil shape which gives a lens effect to said indicia-bearing top surface.

2. The process of claim 1 wherein said foil shapes are formed in a foil substrate, each shape being defined by its sharply defined peripheral edge and decorative emblems are obtained by blanking said lens cap bearing foil shapes from said foil substrate.

3. The method of claim 2 wherein a release liner is provided on the adhesive coated bottom surface of said foil substrate and said blanking step includes formation of a pull tab adjacent said emblem design for easy removal of said release liner.

4. The method of claim 1 wherein said fluent plastic is one which only partially wets the surface of said substrate.

5. The method of claim 4 wherein said fluent plastic is a polyurethane.

6. The method of claim 1 wherein said lens cap has a height from the top of the crown of the lens cap to the base of less than approximately 0.050 inch.

7. The method of claim 1 wherein said substrate is a metal foil.

8. The method of claim 7 wherein said sharply defined peripheral edges are embossed onto said foil substrate.

9. The method of claim 1 wherein said sharply defined peripheral edges are screen printed onto said substrate.

10. The method of claim 9 wherein said substrate is a polyester foil.

11. The method of claim 1 wherein said plurality of orifices is a plurality of closely spaced applicator tubes.

12. The method of claim 11 wherein said nozzle is mounted on a carriage and its movement from a location over one emblem design to another is automatically controlled.

* * * * *